United States Patent [19]

Bettcher

[11] 3,926,080

[45] Dec. 16, 1975

[54] APPARATUS FOR AND METHOD OF PROCESSING MEAT PRODUCTS

[75] Inventor: Louis A. Bettcher, Amherst, Ohio

[73] Assignee: Bettcher Industries, Inc., Birmingham, Ohio

[22] Filed: Sept. 10, 1973

[21] Appl. No.: 395,859

[52] U.S. Cl. .................................. 83/15; 83/170
[51] Int. Cl.² ...................................... B26D 7/08
[58] Field of Search ............. 83/15, 170; 17/52, 51, 17/46; 144/311

[56] References Cited
UNITED STATES PATENTS

| | | | |
|---|---|---|---|
| 3,101,757 | 8/1963 | Hanson | 144/311 |
| 3,151,991 | 10/1964 | Evans et al. | 83/15 X |
| 3,587,689 | 6/1971 | Bettcher | 83/404.3 |
| 3,803,958 | 4/1974 | Fernandez-Moran | 83/15 |

*Primary Examiner*—Frank T. Yost
*Attorney, Agent, or Firm*—Watts, Hoffmann, Fisher & Heinke Co.

[57] ABSTRACT

An apparatus for and method of processing meat products, such as, beef and/or pork carcasses, or parts thereof, for retail distribution, which includes successive stations at which the product to be processed is sawed or cut into predetermined parts and the bulk or primal cuts thus produced trimmed of unwanted fat while in the fresh state and subsequently immersed in liquid nitrogen to crust freeze merely the exterior portion, cut into retail portions of predetermined size, weighed, and/or packaged while so frozen.

5 Claims, 2 Drawing Figures

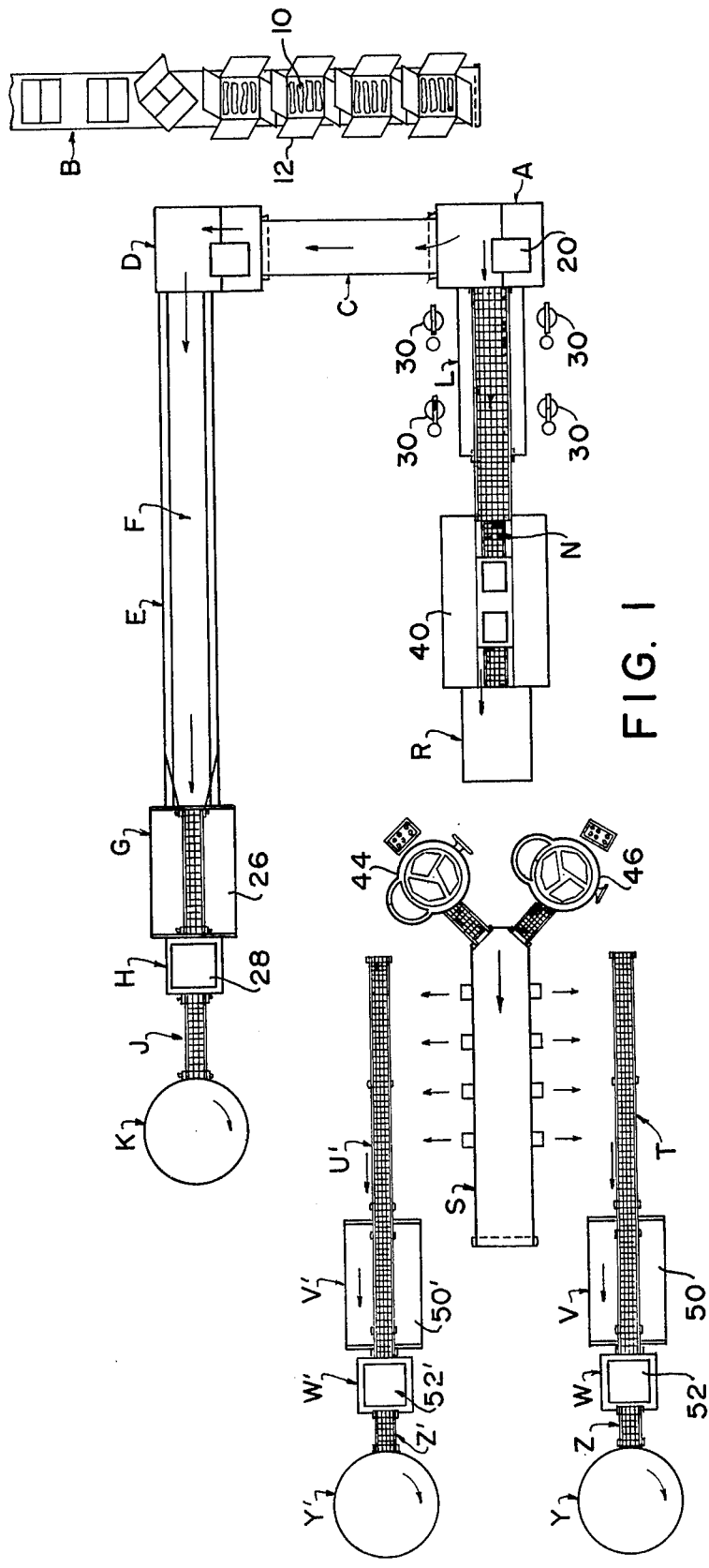
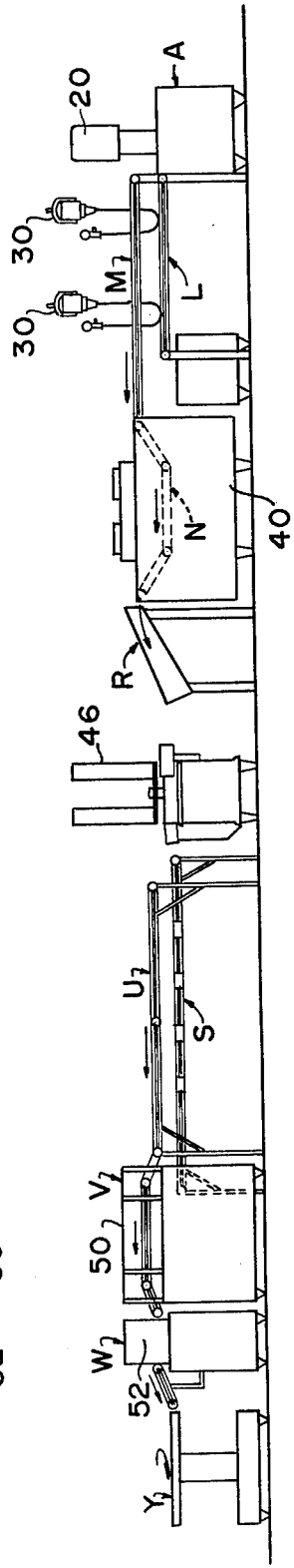
FIG. 1
FIG. 2

APPARATUS FOR AND METHOD OF PROCESSING MEAT PRODUCTS

BACKGROUND OF THE INVENTION

1. Field of the Invention

The invention relates to the processing of comestible bodies, such as, beef and/or pork carcasses and/or parts thereof.

2. Description of the Prior Art

Prior apparatus for and methods of processing comestible bodies, such as, beef and/or pork carcasses or parts thereof for the retail and like trade, and which included the production of smaller parts, are cumbersome, slow and expensive, involve considerable handling of the product by personnel, unduly exposed the product to contamination, and/or produced a product of poor color and one having a short shelf life.

SUMMARY OF THE INVENTION

The invention provides novel and improved high speed apparatus for and methods of processing comestible bodies, such as, beef and/or pork carcasses and bulk of primal cuts thereof, in a continuous manner into different form, preferably of retail size, with minimum handling by personnel, free from ice crystals and having good color and a relatively long shelf life with minimum moisture loss, which includes crust freezing merely the exterior of a comestible body such as, a bulk or primal cut of meat and while so frozen cutting the same into smaller parts. The body or cut being processed is preferably crust frozen by immersion in a cryogenic fluid, preferably liquid nitrogen so as to avoid dehydration typical of conventional temperature conditions, such as, blast freezing, and subsequently converted to a different form, cut into smaller parts preferably by power apparatus, such as disclosed in U.S. Pat. Nos. 3,434,519 and 3,587,689.

The present apparatus and process eliminates reducing the temperature of a product being processed in conventional freezers, a common practice in the art, which required a relatively long time, results in weight loss of the product through dehydration, produces ice crystals in the product and "drip loss" in the display counter, etc.

BRIEF DESCRIPTION OF THE DRAWINGS

FIG. 1 is a fragmentary plan view of a pork loin room of a meat processing plant showing one embodiment of the invention; and FIG. 2 is a front side elevational view of the apparatus shown in FIG. 2.

DESCRIPTION OF THE PREFERRED EMBODIMENT

The invention is shown in the drawings as embodied in a meat plant for processing comestible bodies such as beef and/or pork carcasses or parts thereof into sections of predetermined size and more specifically pork sides into shoulders, butts and pork loins, and further processing the pork loins into pork chops for the retail trade.

At a first station, designated generally by the reference character A, the comestible body to be processed, in the present instance, pork sides 10 in their fresh state arrive in containers 12 on a conveyor B, from which they are transferred by an operator to a saw or guillotine 20 where one or both ends are cut off producing shoulders, center cuts, ham ends, shoulder ends, country ribs and whole loins. The shoulders, loin sections not intended for chops and country ribs are placed on a conveyor C which conveys them to station D where they are processed into other retail cuts. From station D the work bodies produced there are placed on a conveyor E where they are trayed by operators stationed along the conveyor and placed on a conveyor F located above and narrower than conveyor E. Conveyor E conveys the trayed work bodies to a wrapping station G where they are wrapped, preferably by automatic wrapping apparatus 26, and conveyed to station H where the wrapped products are weighed on scales 28 and labeled. The wrapped, weighed and labeled products, such as, country ribs, shoulders, roasts and butt steaks are thereafter transferred to a conveyor J which conveys them to a round rotary inspection table K.

At station A the pork loins are placed on a conveyor L where unwanted or undesirable parts, such as fat, are trimmed from the work bodies, preferably by power knives 30, such as disclosed in U.S. Pat. No. 3,024,538, by operators stationed along the conveyor. The trimmed loins are placed on a conveyor M above conveyor L and of less width than conveyor L. The conveyor M conveys the pork loin to conveyor N which conveys the loins through a cryogenic fluid, preferably liquid nitrogen, in a tank 40. In the tank 40 the pork loins are immersed in the liquid nitrogen and are quickly crust frozen, preferably to a depth of approximately 1/16 to ⅛ of an inch. From station P the crust frozen loins are transferred to a holding table R from which they are transferred by operators to slicing apparatus 44, 46, preferably such as that disclosed in U.S. Pat. Nos. 3,434,518 or 3,587,689, where they are sliced while crust frozen into pork chops of predetermined size.

Liquid nitrogen is preferred as the cryogenic fluid because it does not contaminate the product and crust freezing to a depth of from 1/16 to ⅛ of an inch. Immersing the product in liquid nitrogen is fast, leaves the major portion of the product at least close to its original fresh state and has a deleterious effect upon bacteria on the surface of the product that may be harmful to it. Usually the crust is frozen to −40°F., or lower without materially affecting the interior or core temperature of the meat chilled. Crust freezing stiffens the product making it easier to cut and subsequently handle.

Slicing of the stiffened product is performed on the aforementioned equipment very quickly and expeditiously making it readily possible to process a product such as pork chops from pork loins, ready for retail, while still crust frozen. The frozen crust on the chop or other retail cut acts as a refrigerant during subsequent handling and storage and thus extends the shelf life of the product, etc. In other words, the crust frozen cut in effect carries or is provided with its own refrigerant.

From the slicing apparatus 40, 46 the products now in the form of chops are transferred to a traying conveyor S where they are trayed by operators stationed along the conveyor and transferred to conveyors T, U at opposite sides of the traying conveyor. Conveyor T transfers the products thereon to stations V, W having wrapping apparatus 50 and scales 52 where they are wrapped, labeled and weighed and subsequently transferred to a rotary inspection table Y by a conveyor Z. The products on conveyor U are transferred to wrapping and labeling, weighing and inspection stations similar to and having similar equipment as stations V, W, Y and designation by the same reference characters with a prime mark added thereto.

From the inspection tables the packaged products may be then transferred to baskets on a suitable conveyor for further disposition. The reference character 60 designates a fat and/or other scrap receptacle. The holding table, conveyors and inspection tables, etc. are all commercially available and per se forming no part of the present invention.

Power trimming knives suitable for use at station L and severing or cutting apparatus such as the cutters 44, 46 are available from Bettcher Industries, Inc., Birmingham, Ohio, as "Whizard" power knives and power "Cleaver" cutters. Such cutters are capable of producing 180 and more pork chops from pork loins per minute.

While a preferred meat processing plant is disclosed, it is to be understood that some of the stations and operations referred to are optional, for example, stations A and/or D may be omitted if the work bodies arrive at these respective stations in desired sizes and/or conditions.

As previously indicated, the present invention is characterized by a continuous process which includes crust freezing the surface of a comestible body, for example, a pork loin, to cut into small pieces, for example, pork chops, and while so frozen, severing the workbody into pieces of desired size with apparatus of the character described. The power "Cleaver" cutter referred to is capable of cutting frozen fair size work bodies such as pork loins, even though such bodies may include bones as does a pork loin.

While the preferred method and apparatus has been described in considerable detail, it is to be understood that the invention is not limited to the specific steps and/or apparatus described and it is the intention to hereby cover all adaptations, modifications and variations thereof which come within the practice of those skilled in the art to which the invention relates and the scope of the appended claims.

What is claimed is:

1. The method of subdividing a comestible body which comprises the step of immersing the comestible body in liquid nitrogen to crust freeze the same, removing the crust frozen body from the liquid nitrogen and while so frozen severing the body into smaller parts.

2. The method of subdividing a comestible body which comprises the steps of immersing the comestible body in liquid nitrogen to crust freeze the same to about $-40°F$, removing the crust frozen body from the liquid nitrogen and while so frozen cutting the body into smaller parts.

3. The method of producing pork chops from a pork loin which comprises immersing a pork loin in liquid nitrogen to crust freeze the same, removing the crust frozen body from the liquid nitrogen and while so frozen severing the loin into chops.

4. The method of producing pork chops from a pork loin which comprises immersing a pork loin in liquid nitrogen to freeze only the exterior portion thereof to about $-40°F$. or lower, removing the crust frozen body from the liquid nitrogen and while so frozen severing the loin into chops.

5. In an apparatus for processing comestible bodies; a tank of liquid nitrogen for immersion of a comestible body; a conveyor for moving a comestible body through said tank to freeze only the exterior portion of the comestible body; and severing apparatus downstream from said tank for severing the body into smaller parts while the exterior portion remains frozen; said severing apparatus comprising a cutter, a rotatable comestible body carrier, and means for producing relative movement between said cutter and said comestible body carrier.

* * * * *